(12) United States Patent
Stratulate et al.

(10) Patent No.: US 11,506,324 B2
(45) Date of Patent: Nov. 22, 2022

(54) METHOD AND APPARATUS INSTALLING AND REMOVING A PLUG RETAINER

(71) Applicant: GARTECH, LLC, Houston, TX (US)

(72) Inventors: Gary Warren Stratulate, Houston, TX (US); Gary Pendleton, Shotley Bridge (GB)

(73) Assignee: GARTECH, LLC, Houston, TX (US)

( * ) Notice: Subject to any disclaimer, the term of this patent is extended or adjusted under 35 U.S.C. 154(b) by 168 days.

(21) Appl. No.: 17/108,228

(22) Filed: Dec. 1, 2020

(65) Prior Publication Data

US 2022/0170580 A1    Jun. 2, 2022

(51) Int. Cl.
| | |
|---|---|
| *F16L 55/11* | (2006.01) |
| *F16J 13/02* | (2006.01) |
| *F16K 5/18* | (2006.01) |
| *F16J 13/04* | (2006.01) |
| *F04B 53/22* | (2006.01) |

(52) U.S. Cl.
CPC ............... *F16L 55/11* (2013.01); *F16J 13/02* (2013.01); *F04B 53/22* (2013.01); *F16J 13/04* (2013.01); *F16K 5/184* (2013.01)

(58) Field of Classification Search
CPC .................................... F16B 2/14; F16L 55/11
USPC ........ 215/273, 280, 283, 355; 220/236, 237; 292/342, 343
See application file for complete search history.

(56) References Cited

U.S. PATENT DOCUMENTS

| | | | | |
|---|---|---|---|---|
| 1,614,221 A | * | 1/1927 | Westbrook | F16B 2/14 411/538 |
| 2,588,313 A | * | 3/1952 | Weber | F16L 55/11 220/323 |
| 2,709,021 A | * | 5/1955 | Jones | F16J 13/02 220/236 |
| 2,981,575 A | * | 4/1961 | Leman | F16J 13/02 220/304 |
| 6,033,145 A | * | 3/2000 | Xu | F16D 1/06 74/552 |

* cited by examiner

*Primary Examiner* — Robert K Arundale
*Assistant Examiner* — Richard K. Durden
(74) *Attorney, Agent, or Firm* — Ewing & Jones, PLLC (57) ABSTRACT

Aspects of the disclosure provide for a method and apparatus for installing and removing a plug retainer that may be used in a fluid end hydraulic system.

13 Claims, 7 Drawing Sheets

METHOD AND APPARATUS INSTALLING AND REMOVING A PLUG RETAINER

CROSS-REFERENCE TO RELATED APPLICATIONS

None.

FIELD OF THE DISCLOSURE

Aspects of the disclosure relate to plug retaining apparatus. More specifically, aspects of the disclosure relate to methods and apparatus for removal and installation of a plug in a fluid end.

BACKGROUND

Fluid ends are used to transfer hydraulic fluid for high pressure systems. Such high pressure systems can be used in a variety of locations, such as, for example, hydraulic fracturing apparatus. In such apparatus, fluid is delivered from a high pressure pumping unit. The high pressure pump provides a feed water source that is under little to no pressure and then increases the pressure of the fluid such that the fluid may be delivered to a downhole environment. Once in the downhole environment, the fluid is used to fracture rock that is located in a hydrocarbon bearing stratum.

As fluid ends are subject to very high stress, fluid ends can degrade quickly, causing an outage of operations. During the drilling and completion work for a well, daily operations can be very expensive, thereby necessitating that equipment used during these processes be very reliable. While there is a need for such reliable equipment, the reality of such maintenance free and defect free operation is not always attained. Plugs installed in the fluid ends must be removed to allow for inspection of the fluid ends. Such plug removal can be dangerous for workers as heavy machinery is often necessary to allow for manipulation of the components necessary to perform such inspections. Bolting holding such plugs in the fluid end can be torqued to extremely high levels, thereby providing a worker safety issue. Removal of numerous bolts can result in unwanted economic costs for maintenance and inspection processes.

There is a need, therefore, to provide a method and apparatus that will allow for removal of a plug retainer in a fluid end that is superior to conventional technologies.

There is a further need to provide a method and apparatus for removal of a plug retainer that is more economical than conventional technologies.

There is a still further need to provide a cost effective manufactured product to aid in plug removal, thereby limiting capital expenses for such operations.

There is a still further need to provide a lower stress alternative to conventional apparatus to conduct removal operations, thereby enhancing worker safety.

There is a still further need to provide an apparatus and method to perform such operations that are based upon hand tools and skills that are readily available by the average worker.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of installing a plug into a fluid end is disclosed. The method may comprise inserting the plug into the fluid end into an initial seated position. The method may further comprise positioning a body of an arrangement on the fluid end over the plug in the initial seated position. The method may also comprise sliding a retainer into the body of the arrangement, wherein the bottom of the retainer contacts the plug, and an upper surface of the retainer engages a mating taper in the body. The method may further comprise installing bolts through the retainer into the body of the arrangement such that the bottom of the retainer seats the plug.

In a further example embodiment, a method of removing a plug from a fluid end is disclosed. The method may comprise untorquing bolts in a retainer that extends into a body of an arrangement. The method may also comprise removing the untorqued bolts in the retainer from the body of the arrangement. The method may also provide for sliding the retainer out of the body of the arrangement, wherein the sliding of the retainer removes a compression force of the plug into the fluid end. The method may also provide for removing the plug from the fluid end.

In a further example, an arrangement is disclosed. The arrangement may comprise a retainer with a top surface and a bottom surface, wherein the bottom surface is configured to interface with a plug for a fluid end, the retainer configured with at least one hole. The arrangement may further comprise a body configured to receive at least a portion of the retainer. The arrangement may also comprise at least one bolt configured to be inserted through the at least one hole and into the body. The arrangement may also comprise at least two studs configured to attach the body to one surface of the fluid end. The arrangement may also comprise at least one nut and washer for each of the at least two studs.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 1:
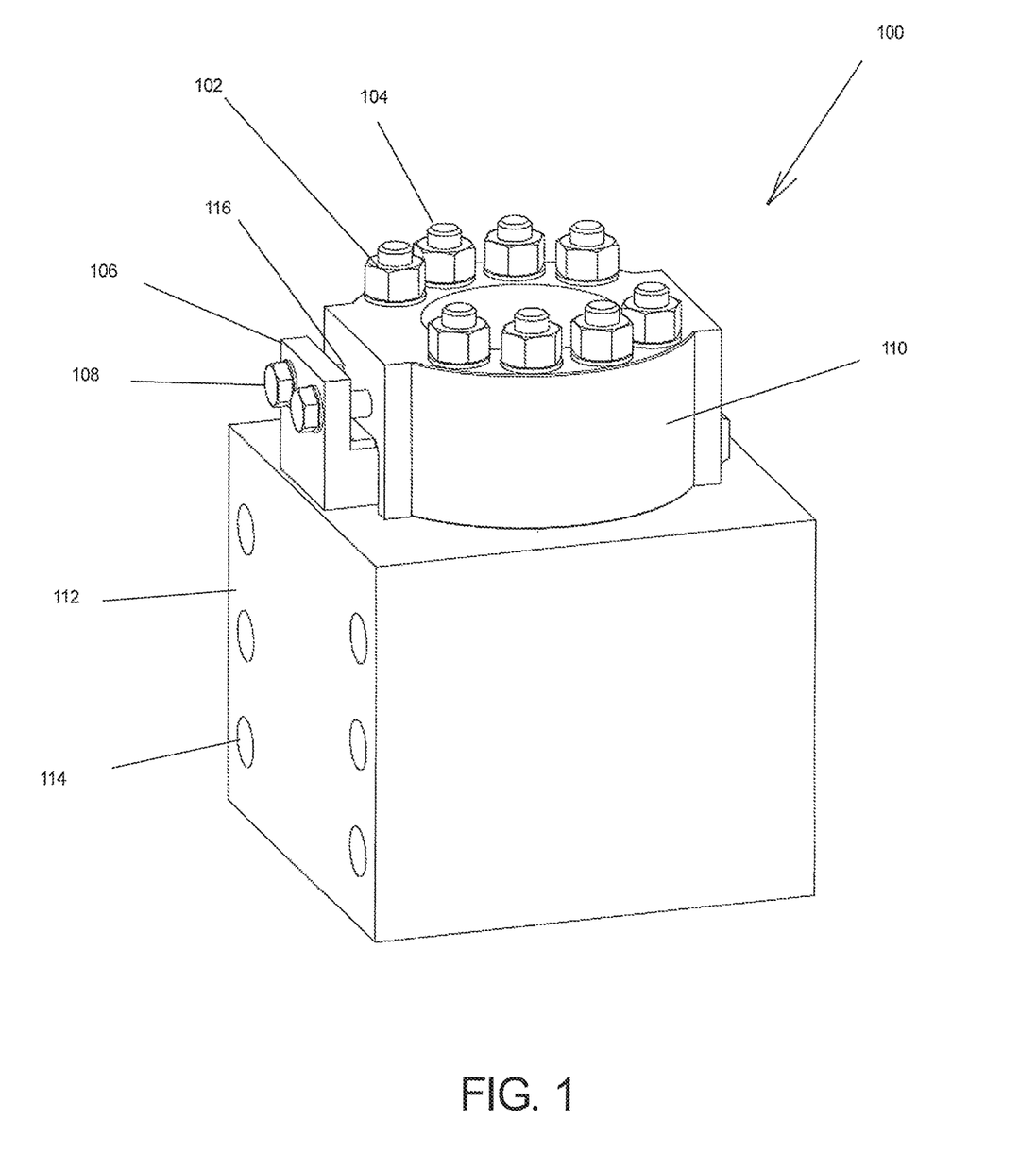
FIG. 1 is a side elevational view of an apparatus in accordance with one example embodiment of the disclosure.

Embodiments of the disclosure provide for an apparatus to install, maintain and remove a plug from a fluid end such that the removal procedures are safe and economically efficient. Referring to FIG. 1, the apparatus 100 provides for a body 110 to be installed over a plug (described later). In the illustrated embodiment, the body 110 is configured as a round arrangement with a series of nuts 102 and corresponding studs 104 that are installed through the body 110 and into the fluid end 112. In embodiments, the corresponding studs 104 may be configured with a threaded surface that mates with a corresponding threaded surface 116 in the body 110 and the fluid end 112. In this way, quick and reliable attachment of the body 110 may be achieved. The studs 104 are maintained in place with the nuts 102 installed over the ends of the studs 104. The nuts 102 and studs 104 may use any threading to allow the nuts 102 and studs 104 from separating. The fluid end 112 is configured with attachment points 114. The attachment points 114 allow for the fluid end 112 to be installed on a prime mover, such as an internal combustion engine, to allow for a working fluid to be delivered. The internal combustion engine may be a diesel or a gasoline engine, as non-limiting embodiments.

In embodiments, bolts 108 penetrate a retainer 106 that is configured to slide in and out of the body 110. The retainer 106 and the body 110 may have respective threaded portions that interact with the bolts 108. The retainer 106, in the illustrated embodiment, may be configured in an "L" shape wherein one portion of the retainer 106 contacts the fluid end 112 and another portion of the retainer 106 accepts the bolts 108.

Figure 2:
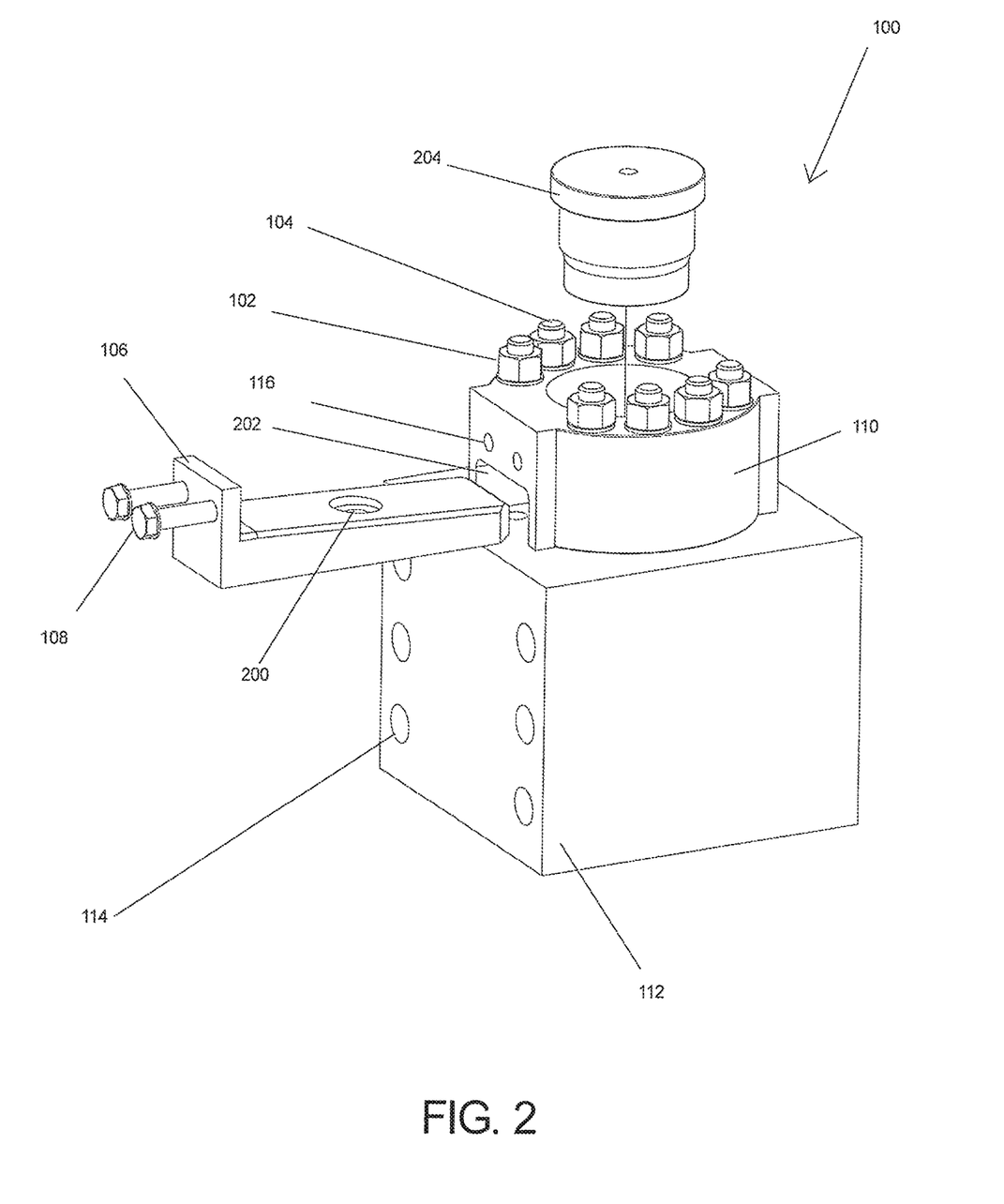
FIG. 2 is a side elevational view of the apparatus of FIG. 1 with some components withdrawn for clarity of illustration.

Referring to FIG. 2, an exploded view of the embodiment of FIG. 1 is presented. In this view, the retainer 106 is removed from the body 110, illustrating the "L" shape described earlier. The bolts 108 are configured to penetrate the retainer 106 and enter the body 110 at the threaded surfaces 116: With the retainer 106 removed, the plug 204 may pass through the top of the arrangement 100. While not shown, the plug 204 may be installed in the fluid end 112 with a gasket to prevent leaks from developing at the high pressures developed within the fluid end 112.

The arrangement may be made of metallic materials, such as stainless steel to allow for use in rugged environments. Materials used in gaskets, described later, may be made of elastic or metal components. In embodiments, a port 200 may be provided such that access to a top of the plug 204 is achieved. The body 110 may be configured with an access slot 202 that allows the retainer 106 to be slid into place. The access slot 202, in the example embodiment, is rectangular in shape to accept the retainer 106.

Figure 3:
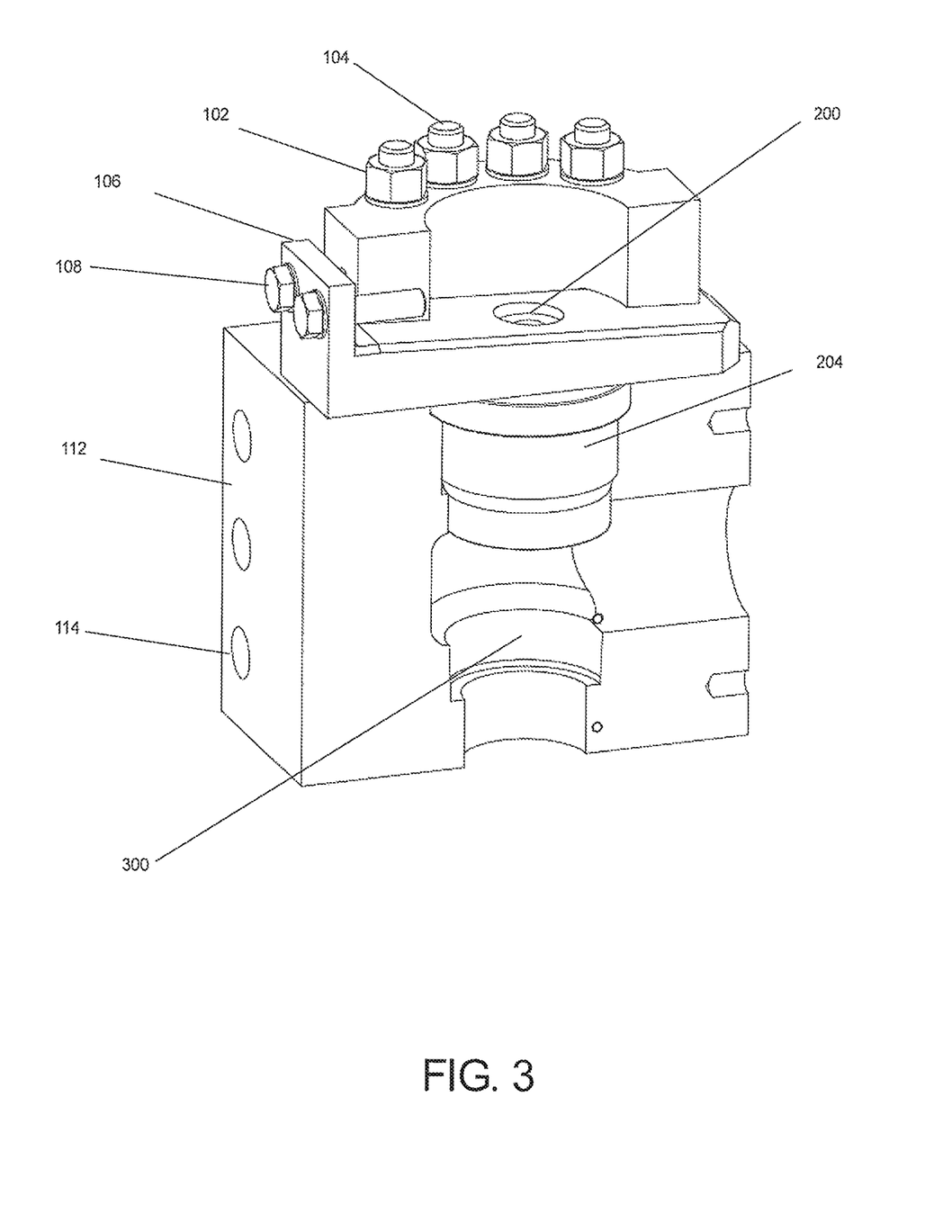
FIG. 3 is a side cross-sectional view of the apparatus of FIG. 1.

Referring to FIG. 3, a cross-section of the arrangement 100 is illustrated. As can be seen, the fluid end 112 has a channel 300 into which the plug 204 is positioned. As will be understood, the plug 204 may be installed with a gasket as an interface between the plug 204 and the fluid end 112. As will be understood, the port 200 may be used to access the plug 204. The top of the plug 204 may have a mechanical connection such that a power tool may be used for manipulation of the plug 204.

Figure 4:
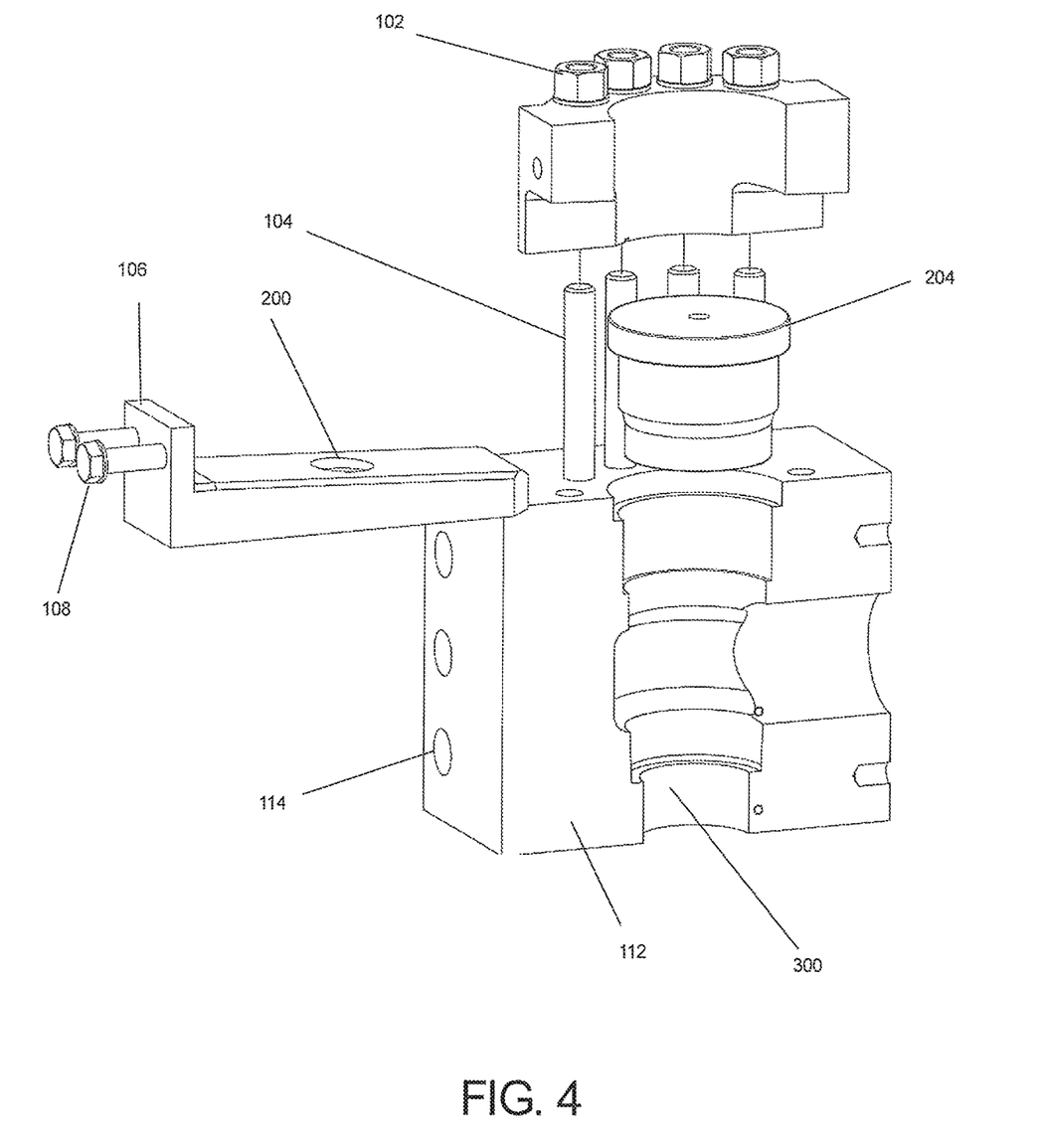
FIG. 4 is a side cross-sectional view of the apparatus of FIG. 1 with some components withdrawn for clarity of illustration.

Referring to FIG. 4, an exploded view of the arrangement of FIG. 3 is illustrated. In this exploded view, the plug 204 is removed from the installation position provided in FIG. 3. The studs 104 are further illustrated as removed from the body 110. The retainer 106 is illustrated in a position such that the bolts 108 are removed from the body 110.

Figure 5:
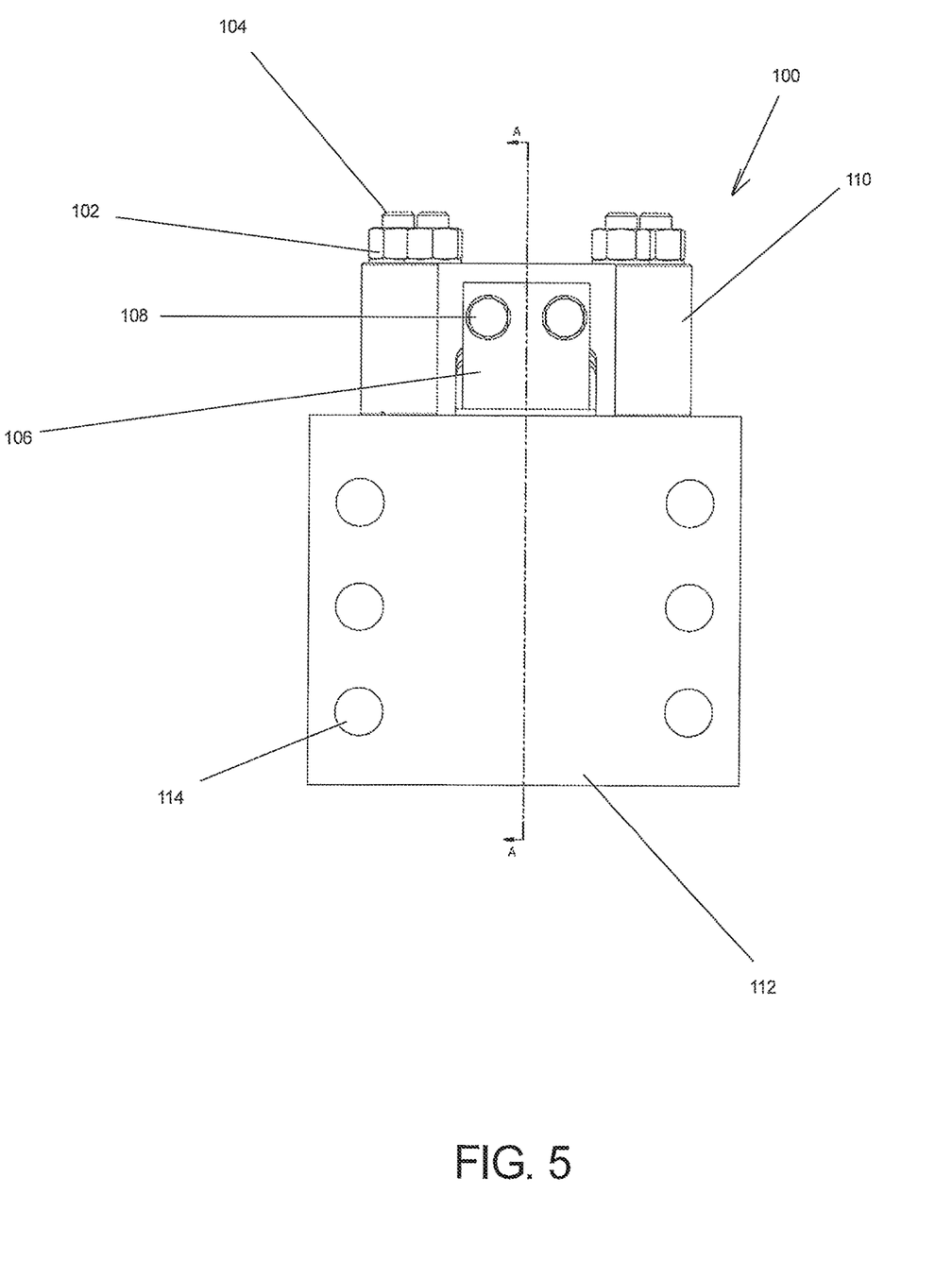
FIG. 5 is an end view of the apparatus of FIG. 1
Figure 6:
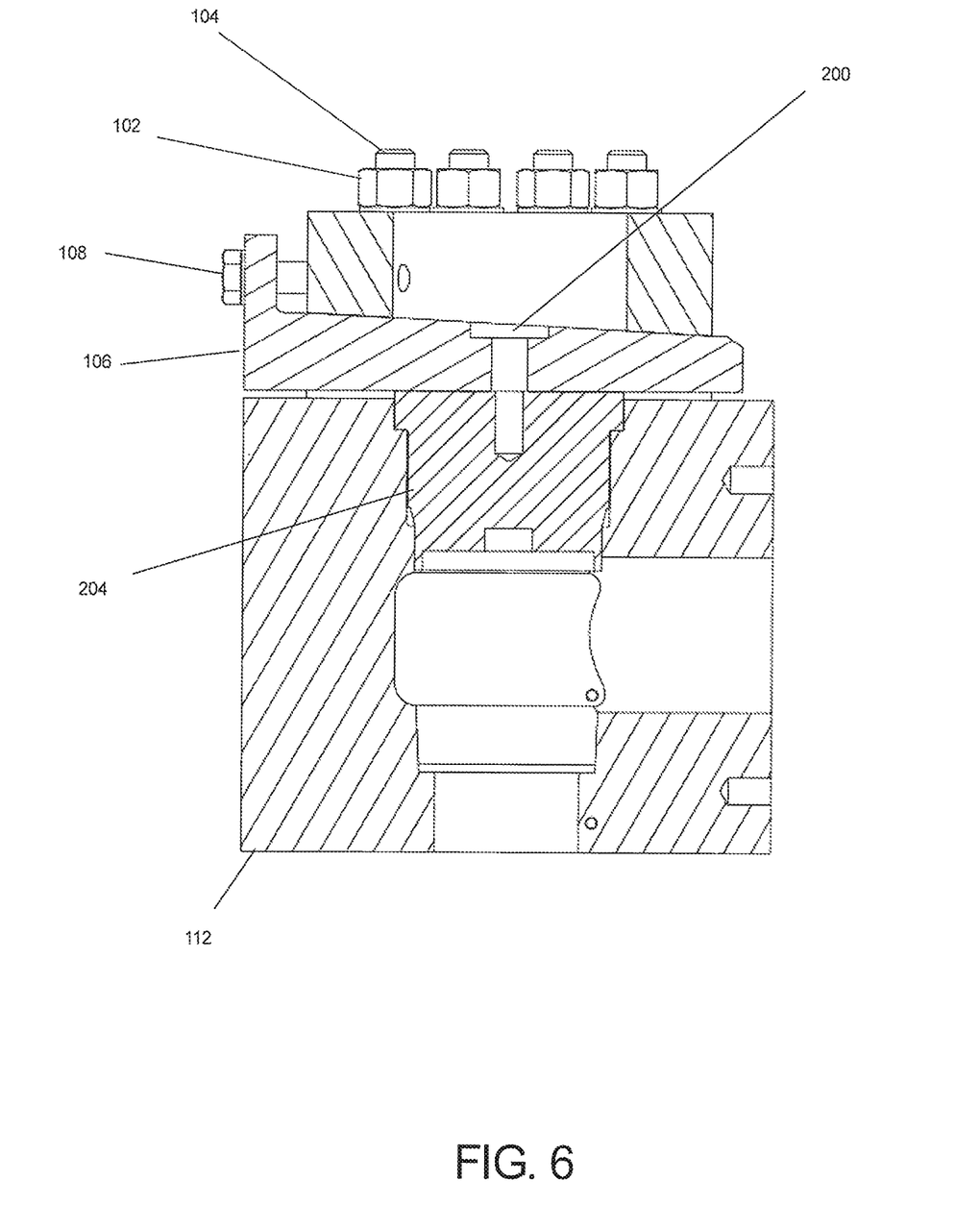
FIG. 6 is a cross-sectional view of the apparatus of FIG. 5 along sectional cut A-A.

Referring to FIG. 5, a side view of the arrangement 100 is illustrated. The side view shows a cut line section A-A, which is described in relation to FIG. 6. Referring to FIG. 6, the bolts 108 that attach the retainer 106 are illustrated as passing through the circular upper portion of the body 110.

Figure 7:
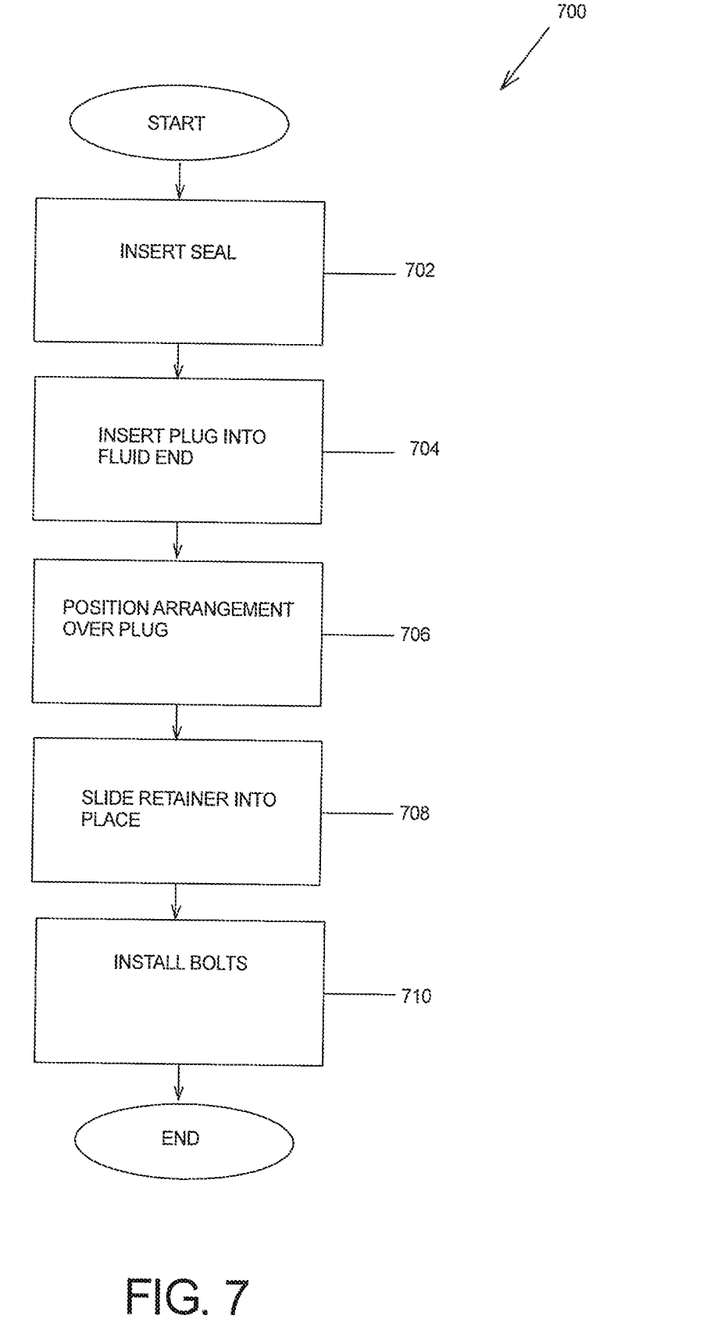
FIG. 7 is a method of installing a plug retainer in a fluid end in accordance with one example embodiment of the disclosure.

Referring to FIG. 7, a method 700 of assembling a plug in a fluid end is described. In this method 700, at 702 a seal may be inserted into the fluid end, before installation of the plug. At 704, the plug may be inserted into an initial seated position located in the fluid end body. At 706, a body of an arrangement is positioned on the fluid end over the initial seated position of the plug. At 708, the retainer is slid into place into the body of the arrangement. In this position, the retainer lower surface engages with the plug and the upper surface of the retainer engages with a mating taper in a retaining ring of the body. The position is identified as an initial engaging state. At 710, bolts are installed through the retainer and into the body, thereby drawing the retainer into the body. As the bolts are tightened, the bottom surface of the retainer impacts the plug, thereby seating the plug. As will be understood, studs and nuts may be used in the positioning the body over the fluid end as recited in 706.

Removal of a plug is the reverse of the above method. In this embodiment, a lever may be used to release the retainer. In embodiments, a tool may be used to detorque the plug from the fluid end.

In one example embodiment, a method of installing a plug into a fluid end is disclosed. The method may comprise inserting the plug into the fluid end into an initial seated position. The method may further comprise positioning a body of an arrangement on the fluid end over the plug in the initial seated position. The method may also comprise sliding a retainer into the body of the arrangement, wherein the bottom of the retainer contacts the plug and an upper surface of the retainer engages a mating taper in the body. The method may further comprise installing bolts through the retainer into the body of the arrangement such that the bottom of the retainer seats the plug.

In a further example embodiment, the method may further comprise installing studs and nuts to connect the body of the arrangement to the fluid end.

In a further example embodiment, the method may further comprise inserting a gasket into the fluid end prior to inserting the plug into the initial seated position.

In a further example embodiment, the method may be performed wherein the installing bolts through the retainer results in the retainer pushing the plug into the gasket.

In a further example embodiment, a method of removing a plug from a fluid end is disclosed. The method may comprise untorquing bolts in a retainer that extends into a body of an arrangement. The method may also comprise removing the untorqued bolts in the retainer from the body of the arrangement. The method may also provide for sliding the retainer out of the body of the arrangement, wherein the sliding of the retainer removes a compression force of the plug into the fluid end. The method may also provide for removing the plug from the fluid end.

In a further example embodiment, the method may further comprise removing studs and nuts that connect the body of the arrangement to the fluid end.

In a further example embodiment, the method may further comprise removing a gasket from the fluid end, wherein the gasket is located between the fluid end and the plug.

In a further example an arrangement is disclosed. The arrangement may comprise a retainer with a top surface and a bottom surface, wherein the bottom surface is configured to interface with a plug for a fluid end, the retainer configured with at least one hole. The arrangement may further comprise a body configured to receive at least a portion of the retainer. The arrangement may also comprise at least one bolt configured to be inserted through the at least one hole and into the body. The arrangement may also comprise at least two studs configured to attach the body to one surface of the fluid end. The arrangement may also comprise at least one nut and washer for each of the at least two studs.

In a further example embodiment, the arrangement may be configured wherein the retainer is configured in an L shape.

In a further example embodiment, the arrangement may be configured wherein the at least two studs is 12 studs.

In a further example embodiment, the arrangement may be configured wherein the retainer is configured in a taper.

In a further example embodiment, the arrangement may be configured wherein the arrangement is made of stainless steel.

In a further example embodiment, the arrangement may be configured wherein the retainer is configured with a port.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of installing a plug into a fluid end, comprising:
   inserting the plug into the fluid end into an initial seated position;
   positioning a body of an arrangement on the fluid end over the plug in the initial seated position;
   sliding a retainer into the body of the arrangement, wherein the bottom of the retainer contacts the plug and an upper surface of the retainer engages a mating taper in the body; and
   installing bolts through the retainer into the body of the arrangement such that the bottom of the retainer seats the plug.

2. The method according to claim 1, further comprising:
   installing studs and nuts to connect the body of the arrangement to the fluid end.

3. The method according to claim 1, further comprising:
   inserting a gasket into the fluid end prior to inserting the plug into the initial seated position.

4. The method according to claim 1, wherein the installing bolts through the retainer results in the retainer pushing the plug into the gasket.

5. A method of removing a plug from a fluid end, comprising:
   untorquing bolts in a retainer that extends into a body of an arrangement;
   removing the untorqued bolts in the retainer from the body of the arrangement;

sliding the retainer out of the body of the arrangement, wherein the sliding of the retainer removes a compression force of the plug into the fluid end; and removing the plug from the fluid end.

6. The method according to claim 5, further comprising:
removing studs and nuts that connect the body of the arrangement to the fluid end.

7. The method according to claim 5, further comprising:
removing a gasket from the fluid end, wherein the gasket is located between the fluid end and the plug.

8. An arrangement, comprising:
a retainer with a top surface and a bottom surface, wherein the bottom surface is configured to interface with a plug for a fluid end, the retainer configured with at least one hole;
a body configured to receive at least a portion of the retainer;
at least one bolt configured to be inserted through the at least one hole and into the body;
at least two studs configured to attach the body to one surface of the fluid end; and
at least one nut and washer for each of the at least two studs.

9. The arrangement according to claim 8, wherein the retainer is configured in an L shape.

10. The arrangement according to claim 8, wherein the at least two studs is 12 studs.

11. The arrangement according to claim 8, wherein the retainer is configured in a taper.

12. The arrangement according to claim 8, wherein the arrangement is made of stainless steel.

13. The arrangement according to claim 8, wherein the retainer is configured with a port.

* * * * *